United States Patent
Al-Jarrash et al.

(10) Patent No.: US 11,271,821 B1
(45) Date of Patent: Mar. 8, 2022

(54) CENTRALIZED ENGINEERING DESIGN AUTO-GENERATION AND CONFIGURATION MANAGEMENT SYSTEM FOR TRACKING PROJECTS

(71) Applicant: SAUDI ARABIAN OIL COMPANY, Dhahran (SA)

(72) Inventors: Mohammed A. Al-Jarrash, Dhahran (SA); Mohammed S. Abuhaleegah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/220,460

(22) Filed: Apr. 1, 2021

(51) Int. Cl.
| | |
|---|---|
| *H04L 12/24* | (2006.01) |
| *G06F 16/93* | (2019.01) |
| *G06F 30/10* | (2020.01) |
| *H04L 29/08* | (2006.01) |
| *G06F 111/02* | (2020.01) |
| *H04L 41/14* | (2022.01) |
| *H04L 41/0806* | (2022.01) |
| *H04L 67/53* | (2022.01) |

(52) U.S. Cl.
CPC ............ *H04L 41/145* (2013.01); *G06F 16/93* (2019.01); *G06F 30/10* (2020.01); *H04L 41/0806* (2013.01); *H04L 67/20* (2013.01); *G06F 2111/02* (2020.01)

(58) Field of Classification Search
CPC ... H04L 41/145; H04L 41/0806; H04L 67/20; G06F 16/93; G06F 30/10; G06F 2111/02
USPC ....................................................... 709/222
See application file for complete search history.

(56) References Cited

U.S. PATENT DOCUMENTS

| | | | |
|---|---|---|---|
| 6,058,262 A | 5/2000 | Kawas et al. | |
| 6,907,546 B1* | 6/2005 | Haswell | G06F 11/3684 714/38.11 |
| 7,295,960 B2 | 11/2007 | Rappaport et al. | |
| 8,060,458 B2 | 11/2011 | Li et al. | |
| 8,503,336 B2 | 8/2013 | Rappaport et al. | |
| 10,154,091 B1* | 12/2018 | Flaherty | H04L 41/0806 |
| 2008/0040455 A1* | 2/2008 | MacLeod | G06F 8/61 709/220 |
| 2010/0250497 A1* | 9/2010 | Redlich | H04L 63/0227 707/661 |
| 2010/0305931 A1 | 12/2010 | Fordham | |

(Continued)

OTHER PUBLICATIONS

Virtual Basic, Virtual Basic, Jun. 15, 2017 https://web.archive.org/web/20170615022030/https://virtualbasic.org/ (Year: 2017).*

*Primary Examiner* — James E Springer
(74) *Attorney, Agent, or Firm* — Osha Bergman Watanabe & Burton LLP (57) ABSTRACT

A method for network deployment is disclosed. The method includes receiving, from a user by a centralized system, a plurality of completed task detail forms, retrieving, by the centralized system and from the plurality of completed task detail forms, deployment task descriptions of a plurality of network devices, generating, by the centralized system and based on the deployment task descriptions, an engineering design package comprising a specification and associated configuration and connectivity information of each of the plurality of network devices, and deploying, based on the engineering design package, the plurality of network devices.

15 Claims, 9 Drawing Sheets

(56) References Cited

U.S. PATENT DOCUMENTS

2014/0344778 A1* 11/2014 Lau ...................... G06F 16/254
                                                        717/106

* cited by examiner

| TASK TITLE | STATUS | ASSIGNED TO | DESCRIPTION | NE EWO | CRQ | CRQ Date | OLD SN | PHASE | NEW HOSTNAME | NEW SN | PHYSICAL IC | INSTRUCTIONS | AITD |
|---|---|---|---|---|---|---|---|---|---|---|---|---|---|
| DHAB0175-AN2DA2-01H | RU EWO SUBMITTED | MOHAMMED HAMDAN | 5406 5 CARDS | 1428898 | CRQ000000154597 | 5/1/2019 | SG923BY1WD | PHASE 1 | DHAB0175-AN2DA2-01A | SG8AG4900D | SW404376 | | CA |
| DHAB0175-AN2DA3-01H | VERIFIED | MOHAMMED HAMDAN | NSV | 1468097 | CRQ000000170358 | 2/24/2020 | SG45DXT2J8 | 2020-PHASE 1 | DHAB0175-AN2DA3-01A | SG99G4903J5 | | 5406R | CA |
| DHAB0175-AN3DA1-01H | VERIFIED | MOHAMMED HAMDAN | NSV | 1468097 | CRQ000000170358 | 2/24/2020 | SG29SU1YC | 2020-PHASE 1 | DHAB0175-AN3DA1-01A | SG99G4903J7 | | 5406R | CA |
| DHAB0175-AN3DA2-01H | RU EWO SUBMITTED | MOHAMMED HAMDAN | 5406 4 CARDS | 1428899 | CRQ000000154597 | 5/1/2019 | SG940BY2DT | PHASE 1 | DHAB0175-AN3DA2-01A | SG8AG4900J | SW404377 | | CA |
| DHAB0175-AN3DA2-02H | NE EWO SUBMITTED | MOHAMMED HAMDAN | NSV | 1487681 | | | SG048TF064 | 2020 | DHAB0175-AN3DA2-02A | SG90GYW06M | | 3810M-24 | CA |
| DHAB0175-AN3DA3-01H | RU EWO SUBMITTED | MOHAMMED HAMDAN | 5406 4 CARDS | 1428900 | CRQ000000154597 | 5/1/2019 | SG940BY2DS | PHASE 1 | DHAB0175-AN3DA3-01A | SG8AG4900L | SW404378 | | CA |
| DHAB0176-RDA103-01H | RU EWO SUBMITTED | MOHAMMED HAMDAN | 5406 4 CARDS | 1428901 | CRQ000000154597 | 5/1/2019 | SG923BY2L5 | PHASE 1 | DHAB0176-RDA103-01A | SG8AG4900M | SW404379 | | CA |
| DHAB0176-RDA108-01H | RU EWO SUBMITTED | MOHAMMED HAMDAN | 5406 4 CARDS DHA-DUD-BMS-1; | 1428902 | CRQ000000154597 | 5/22/2019 | SG923BY2LM | PHASE 1 | DHAB0176-RDA108-01A | SG8AG4900N | SW404380 | | CA |
| DHAB0176-RDA203-01H | RU EWO SUBMITTED | MOHAMMED HAMDAN | 5406 5 CARDS | 1428903 | CRQ000000154597 | 5/1/2019 | SG923BY2L7 | PHASE 1 | DHAB0176-RDA203-01A | SG8AG4900P | SW404381 | | CA |
| DHAB0176-RDA207-01H | NE EWO SUBMITTED | MOHAMMED HAMDAN | NSV | 1487681 | | | SG941BY3TD | 2020 | DHAB0176-RDA207-01A | SG8AG4900Y | | 5406R | CA |
| DHAB0176-RDA207-01H | DEFERRED | MOHAMMED HAMDAN | 5406 5 CARDS | DEFERRED | | | SG941BY3TD | | DHAB0176-RDA207-01A | | | | CA |
| DHAB0176-RDA301-01H | NE EWO SUBMITTED | MOHAMMED HAMDAN | NSV | 1487681 | | | SG45DXT2GM | 2020 | DHAB0176-RDA301-01A | SG9AG49070 | | 5406R | CA |
| DHAB0176-RDA302-01H | NE EWO SUBMITTED | MOHAMMED HAMDAN | NSV | 1487681 | | | SG45DXT2GC | 2020 | DHAB0176-RDA302-01A | SG9AG49071 | | 5406R | CA |
| DHAB0177-RMA119-01H | NE EWO SUBMITTED | MOHAMMED HAMDAN | AE2 1018 | 1496641 | | | SG940BY2DN | 2020 | DHAB0177-RMA119-01A | SG9AG49072 | | 5406R | CA |
| DHAB0177-RMA161-02H | VERIFIED | MOHAMMED HAMDAN | AE2, THIS SWITCH HAS 2 UPLINK | 1468097 | CRQ000000170575 | 2/28/2020 | SG940BY2DQ | 2020-PHASE 1 | DHAB0177-RMA161-02A | SG98G4B02M | | 5412R | CA |
| DHAB0177-RMA229-03H | VERIFIED | MOHAMMED HAMDAN | AE4, THIS SWITCH HAS 2 UPLINK | 1468097 | CRQ000000170575 | 2/28/2020 | SG940BY2FK | 2020-PHASE 1 | DHAB0177-RMA229-03A | SG98G4B02N | | 5412R | CA |

- 2019 - Decommissioned per Area
- 2019 - Modular
- 2019 - Optimized per Area
- Activite Contacts Extended
- Cards qyt
- Completed Tasks
- Contacts Extended
- EDP Generated
- Engineering Completed
- Number of Switches (NE EWO = AP)
- Open Tasks
- Overall Optimization
- Overdue Tasks
- Phase I - Decommissioned per Area
- Phase I - Remaining ALL
- Phase I - Remaining per Area
- Phase I - Replaced ALL
- Phase I - Replaced per Area
- Phase II - Assigned count per Assignee
- Phase II - Cards qyt
- Phase II - Cards qyt per Area
- Phase II - Decommissioned per Area
- Phase II - Optimized per Area 361b

Task List — 2020 - Cards pyt per area

| AITD | 24-ports | 4-SFP | 20-port | MM |
|---|---|---|---|---|
| ABQ | 0 | 105 | 0 | 0 |
| CA | 171 | 115 | 62 | 62 |
| CR | 0 | 28 | 0 | 0 |
| JED | 14 | 0 | 2 | 2 |
| UDH | 2 | 126 | 1 | 1 |
| YAN | 10 | 119 | 6 | 6 |

CENTRALIZED ENGINEERING DESIGN AUTO-GENERATION AND CONFIGURATION MANAGEMENT SYSTEM FOR TRACKING PROJECTS

BACKGROUND

Engineering design packages (EDPs) are documents with detailed information related to equipment specifications, their configurations and physical and logical connectivity. Developing these documents, traditionally done manually, is time consuming and require a dedicated team to oversee a huge scope such as developing thousands of EDPs for a replacement project. In addition, aggregating the required materials in terms of part numbers and quantities manually is a major pain area and prone to errors. Moreover, materials distribution, commissioning and progress tracking can be inaccurate and inefficient as a result of the lack of centralized management system.

SUMMARY

In general, in one aspect, the invention relates to a method for network deployment. The method includes receiving, from a user by a centralized system, a plurality of completed task detail forms, retrieving, by the centralized system and from the plurality of completed task detail forms, deployment task descriptions of a plurality of network devices, generating, by the centralized system and based on the deployment task descriptions, an engineering design package comprising a specification and associated configuration and connectivity information of each of the plurality of network devices, and deploying, based on the engineering design package, the plurality of network devices.

In general, in one aspect, the invention relates to a system for network deployment. The system includes a memory, and a computer processor connected to the memory and that receives, from a user, a plurality of completed task detail forms, retrieves, from the plurality of completed task detail forms, deployment task descriptions of a plurality of network devices, generates, based on the deployment task descriptions, an engineering design package comprising a specification and associated configuration and connectivity information of each of the plurality of network devices, and deploys, based on the engineering design package, the plurality of network devices, wherein the plurality of completed task detail forms, the deployment task descriptions of the plurality of network devices, and the engineering design package are stored in the memory.

In general, in one aspect, the invention relates to a non-transitory computer readable medium (CRM) storing computer readable program code for network deployment. The computer readable program code, when executed by a computer, includes functionality for receiving, from a user, a plurality of completed task detail forms, retrieving, from the plurality of completed task detail forms, deployment task descriptions of a plurality of network devices, generating, based on the deployment task descriptions, an engineering design package comprising a specification and associated configuration and connectivity information of each of the plurality of network devices, and deploying, based on the engineering design package, the plurality of network devices.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A-3F show an example in accordance with one or more embodiments.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method, a system, and a non-transitory computer readable medium for generating engineering design packages (EDPs) and tracking ongoing project inventory and progress to deploy or replace network equipment in the field. In one or more embodiments of the invention, a centralized system receives user input and generates the distribution list for all equipment. In one or more example embodiments, the centralized system is based on virtual Basic integration (VBA) between Microsoft (MS) Access and MS Word. The user inputted parameters and value sets are organized/stored using MS Access, while the EDPs include documents generated using MS WORD. Those skilled in the art will appreciate that other suitable systems/applications may be used without departing from the scope herein.

Figure 1:
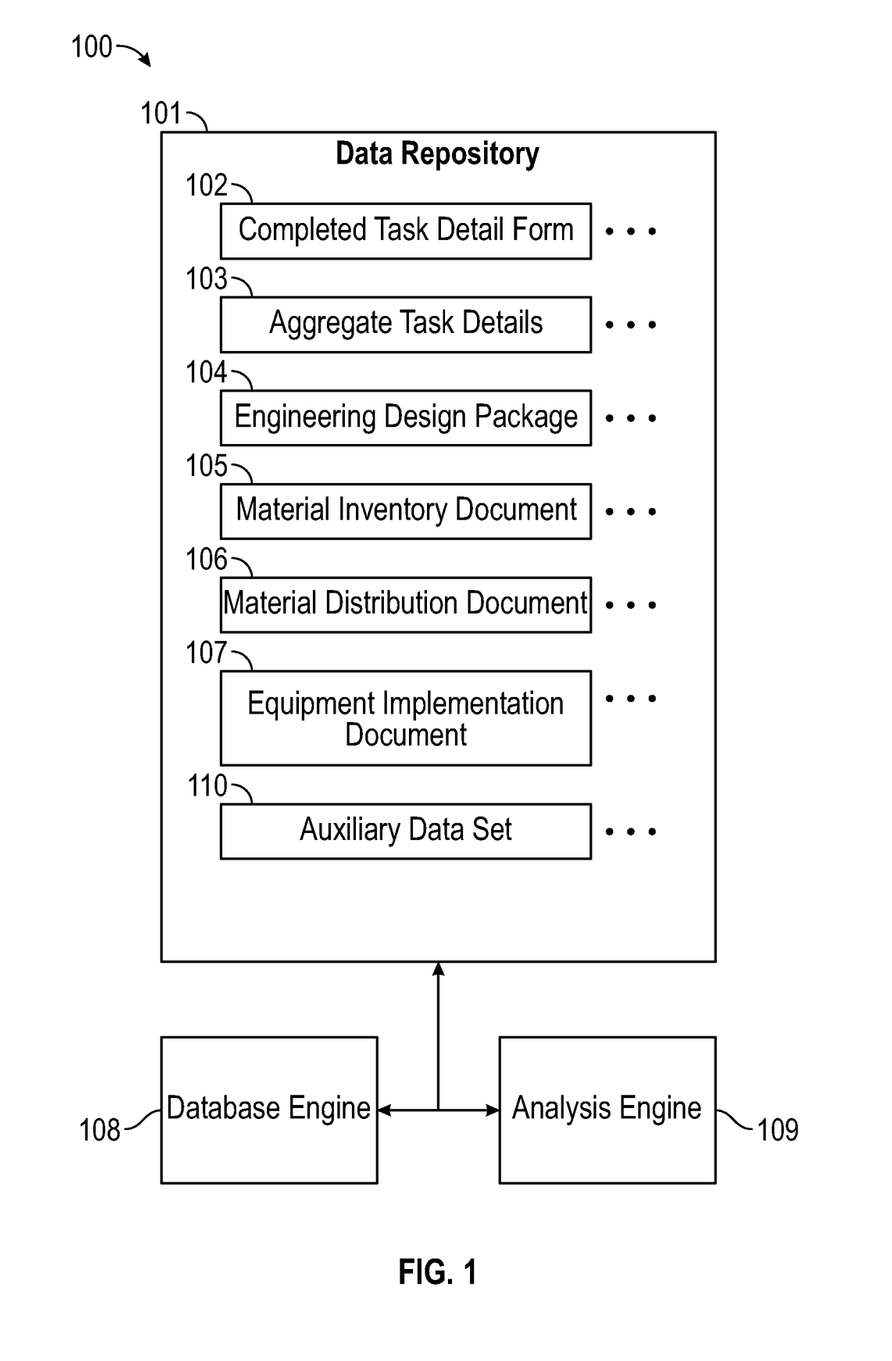
FIG. 1 shows a system in accordance with one or more embodiments.

FIG. 1 shows a schematic diagram in accordance with one or more embodiments. In one or more embodiments, one or more of the modules and/or elements shown in FIG. 1 may be omitted, repeated, and/or substituted. Accordingly, embodiments of the invention should not be considered limited to the specific arrangements of modules and/or elements shown in FIG. 1.

As shown in FIG. 1, the centralized EDP generation and management system (100) has multiple components, including, for example, a data repository (101), a database engine (108), and an analysis engine (109). Each of these components (101, 108, 109) may be implemented in hardware (i.e., circuitry), firmware, software, or any combination thereof. Further, each of these components (101, 108, 109) may be located on the same computing device (e.g., a computer) or on different computing devices connected by a network of any size having wired and/or wireless segments. In one or more embodiments, these components may be implemented using the computing system (400) described below in reference to FIGS. 4A and 4B. Each of these components of FIG. 1 is discussed below.

In one or more embodiments of the invention, the data repository (101) is configured to store data items such as completed task detail forms (e.g., completed task detail form (102)), sets of aggregate task details (e.g., aggregate task details (103)), engineering design packages (e.g., engineering design package (104)), material inventory documents (e.g., material inventory document (105)), material distribution documents (e.g., material distribution document (106)), and equipment implementation documents (e.g., equipment implementation document (107)). Throughout this disclosure, the term "document" may refer to a text document or a collection of data elements representing a text document. In one or more embodiments, the data repository (101) further stores auxiliary data sets (e.g., auxiliary data set (110)) where each auxiliary data set includes predefined network equipment specification, deployment site information, and other related network deployment parameters of a network deployment project.

A completed task detail form (102) is a predefined template that is filled in with user inputted information regarding a particular task to be performed for a network deployment project. A network deployment project is a collection of actions to deploy or replace multiple pieces of network equipment in the field. Each piece of network equipment may correspond to a device or a set of related devices. A set of aggregate task details (103) is a collection of completed task detail forms that are related to the same network deployment project. In other words, multiple sets of aggregate task details (103) may be stored in the data repository that correspond to different network deployment projects.

An engineering design package (104) is a collection of documents for a network deployment project. Each document of the engineering design package (104) includes a specification and associated configuration and connectivity information of a corresponding piece of network equipment of the network deployment project. A material inventory document (105) includes a list of all network equipment to be deployed and/or replaced for a network deployment project. The material distribution document (105) includes a list of all network equipment with corresponding deployment locations for the network deployment project. An equipment implementation document (106) includes a timeline of deploying each piece of network equipment for the network deployment project.

In one or more embodiments of the invention, the database engine (108) is configured to receive completed task detail forms from a user, such as an engineer implementing the network deployment project. Further, the database engine (108) is configured to organize and provide user access to the various data items stored in the data repository (101). In one or more embodiments, the database engine (108) is based on a third party database application, such as Microsoft Access.

In one or more embodiments of the invention, the analysis engine (109) is configured to retrieve deployment task descriptions from the completed task detail forms of a network deployment project. The deployment task descriptions are aggregated to form a set of aggregate task details of the network deployment project. In particular, the analysis engine (109) retrieves the deployment task descriptions from and stores the set of aggregate task details to the data repository (101) using the third party database application, such as Microsoft Access. The analysis engine (109) is further configured to generate an engineering design package based on the deployment task descriptions contained in the aggregate task details of the network deployment project. The engineering design package is used to facilitate deploying each piece of the network equipment of the network deployment project. The analysis engine (109) is further configured to generate the material inventory document, the material distribution document, and the equipment implementation document based on the engineering design package and the auxiliary data set of the network deployment project.

In one or more embodiments of the invention, deploying the network equipment of the network deployment project includes configuring and connecting each piece of the network equipment based on the specification and associated configuration and connectivity information contained in the engineering design package, facilitating the network deployment project based on the material inventory document, the material distribution document, and the equipment implementation document. In one or more embodiments, the analysis engine (109) generates the engineering documents, the material inventory document, the material distribution document, and the equipment implementation document using an application software interface (e.g., Virtual Basic Integration) between the third party database application (e.g., Microsoft Access) and a third party document processing application (e.g., Microsoft WORD).

In one or more embodiments, the database engine (108) and the analysis engine (109) perform the functions described above using the method described in reference to FIG. 2 below. An example of automatically generating EDPs and associated equipment inventory/distribution/implementation documents is described in reference to FIGS. 3A-3F below.

Although the centralized EDP generation and management system (100) is shown as having three components (101, 108, 109), in one or more embodiments of the invention, the centralized EDP generation and management system (100) may have more or fewer components. Furthermore, the functions of each component described above may be split across components. Further still, each component (101, 108, 109) may be utilized multiple times to carry out an iterative operation.

Figure 2:
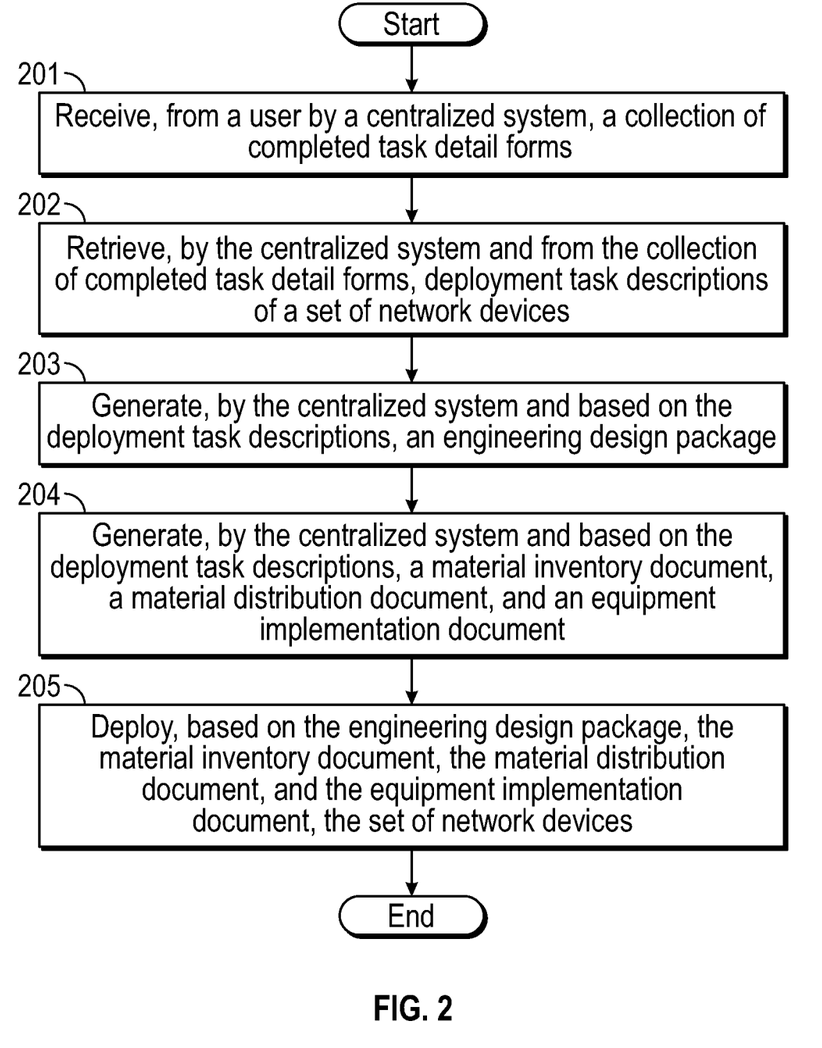
FIG. 2 shows a flowchart in accordance with one or more embodiments.

FIG. 2 shows a flowchart in accordance with one or more embodiments. One or more blocks in FIG. 2 may be performed using one or more components as described in FIGS. 1A-1C. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 201, a collection of completed task detail forms for a network deployment project are received from a user by a centralized system.

In Block 202, deployment task descriptions of the network deployment project are retrieved by the centralized system and from the collection of completed task detail forms.

In Block 203, an engineering design package including a specification and associated configuration and connectivity information of each piece of network equipment of the network deployment project is generated by the centralized system based on the deployment task descriptions.

In Block 204, a material inventory document, a material distribution document, and an equipment implementation document are generated by the centralized system based on the deployment task descriptions.

In Block 205, each piece of the network equipment of the network deployment project is deployed based on the engineering design package. In one or more embodiments, each piece of the network equipment is configured and connected based on the corresponding specification and associated configuration and connectivity information. Further, the network deployment is facilitated using the material inventory document, the material distribution document, and the equipment implementation document. For example, a procurement instruction may be generated for each piece of the network equipment based on the material inventory document. In another example, a shipping/delivery instruction may be generated for each piece of the network equipment based on the material distribution document. In yet another example, a verification instruction may be generated for each piece of the network equipment based on the equipment implementation document. The verification instruction is an instruction to verify whether a particular piece of network equipment has been successfully deployed or replaced in the field. One or more of the procurement instruction, the shipping/delivery instruction, and the verification instruction may be generated in the electronic form or as a physical document.

By way of the system and method of FIGS. 1 and 2, an application/process enhancement for developing Network Engineering designs, and tracking inventory is envisioned. This is done using VBA and integration with Microsoft Word document where an engineer only fills the required fields in the application with multiple parameters and then the application dynamically selects the proper engineering design based on the engineer input. Finally, with a single click, the EDP is automatically generated as a Word document and routed for approval. Once centralized system is populated, all other functionalities such as materials inventory, distribution and progress tracking are dynamically and instantly ready for implementation. This centralized system is also integrated with BMC Remedy system and Ericson Network Engineer application to dynamically sync and reflect all changes.

FIGS. 3A-3F show an example in accordance with one or more embodiments.

The example shown in FIGS. 3A-3F is based on the system and method described in reference to FIGS. 1 and 2 above.

As noted above, manually developing EDP documents is time consuming and require a dedicated team. In addition, manually aggregating the required materials and tracking material distribution, commissioning and progress can be inaccurate and inefficient. The example described below solves the described engineering and management pain areas and drawbacks while minimizes the required manpower to oversee such activities by introducing a new process where the MS Access application is used as frontend and a VBA program is used as backend integrated with MS Word templates. Once the centralized system is populated using user input, all other functionalities such as materials inventory, distribution and progress tracking are dynamically and instantly generated for implementation. This centralized system is also integrated with BMC Remedy system and Ericson Network Engineer application to dynamically synchronize and reflect on-going changes.

Figure 3A:
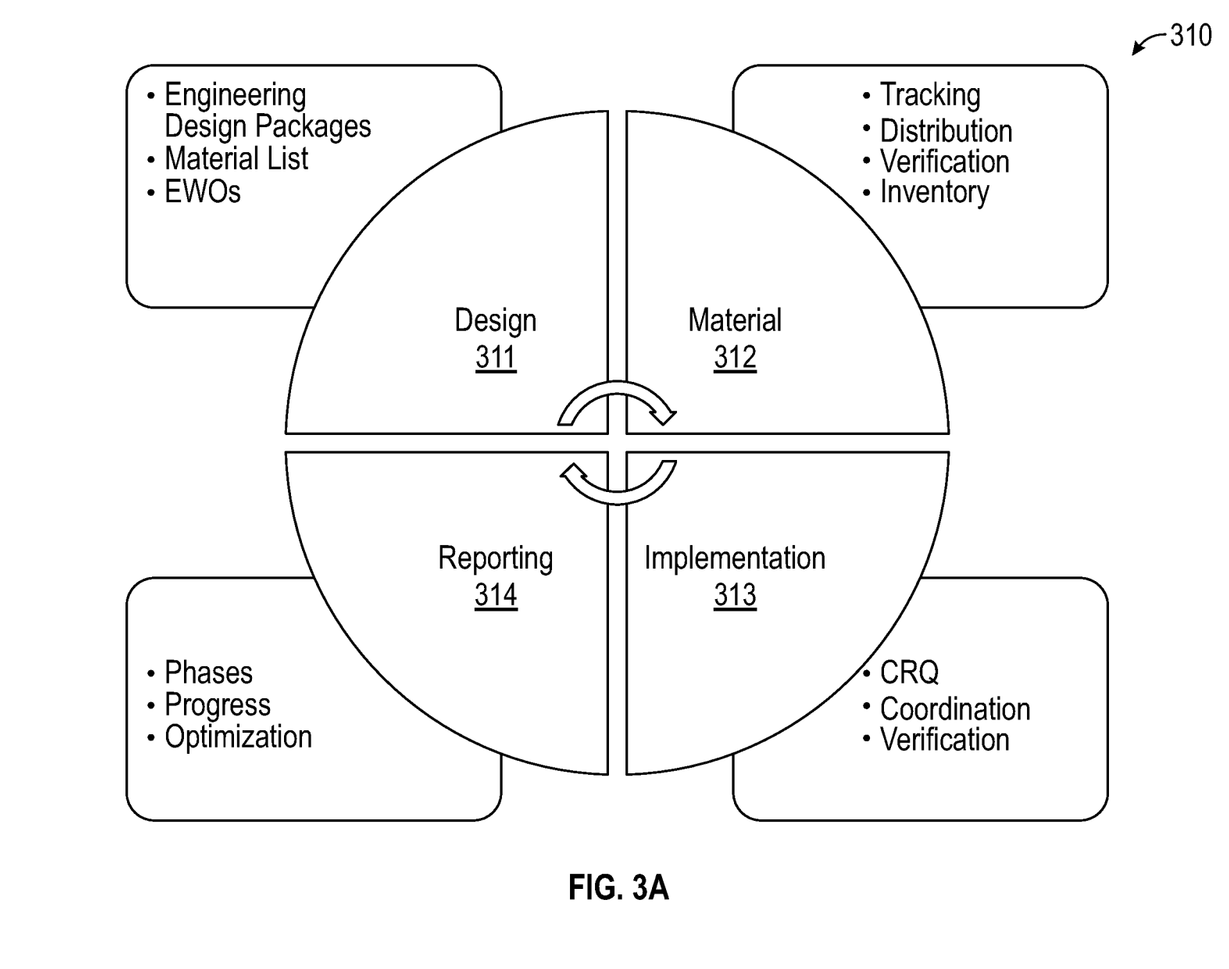

FIG. 3A shows a schematic diagram of an engineering design auto generation and configuration management system (310). As shown in FIG. 3A, the system (310) includes a design module (311), a material module (312), an implementation module (313), and a reporting module (314). The design module (311) receives user input regarding the engineering design packages, material list, and engineering work orders (EWOs). The material module (312) performs various tasks relating to tracking, distribution, verification, and inventory. The implementation module (313) performs various tasks relating to change request (CRQ), coordination, and verification. In particular, the implementation module (313) is used to keep track of scheduled & status of each task, and verify if each task is implemented properly according to the engineering design packages. The report module (314) generates user reports regarding the phases, progress and optimization of the network design.

Figure 3B:
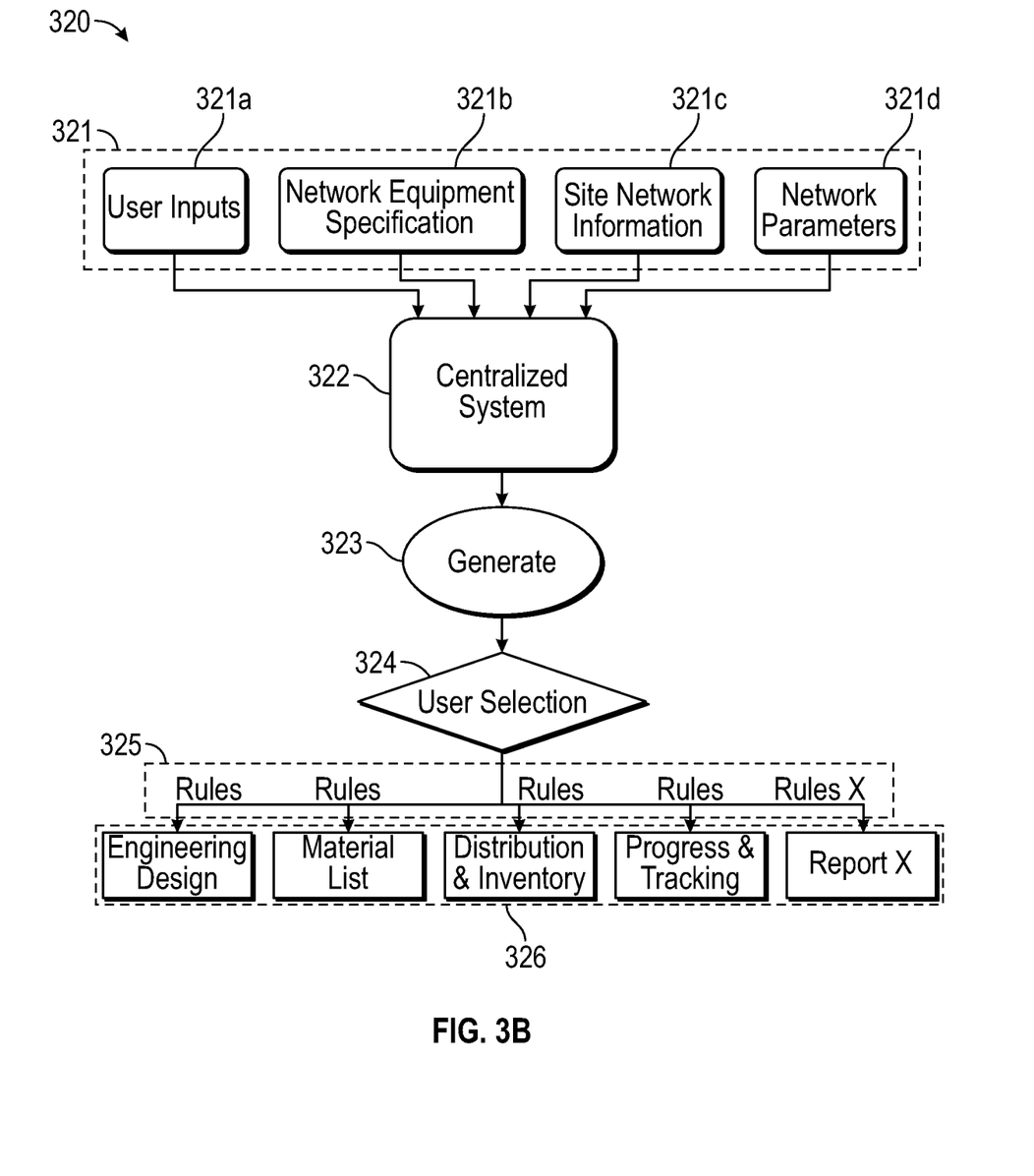

FIG. 3B shows a process diagram (320) for developing network engineering designs, and track inventory. The process is performed by setting multiple rules (325) where the user (e.g., engineer) only fills in multiple parameters (i.e., user input (321a)) for the required fields (322b-322f) in the input forms of the centralized system (322). Accordingly, the centralized system (322) dynamically selects the proper engineering design based on the user input (321a) as well as other information retrieved from a database, such as the network equipment specification (321b), site network information (321c), and network parameters (321d). For example the selected engineering design corresponds to one of the templates (331) depicted in FIG. 3C below. By applying the rules (325) according to the user selection (324), rule based output data (326), such as engineering designs (configurations of network devices), material list, distribution & inventory, progress & tracking, and other reports (ReportX), are automatically generated based on the selected engineering design (e.g., one of the templates (331)). In one or more embodiments, different set of rules results in different selection of template. For example if the user input field uplink type (322b) is set to "Fiber optic," then "Template 1" is selected from the templates (331).

Figure 3C:
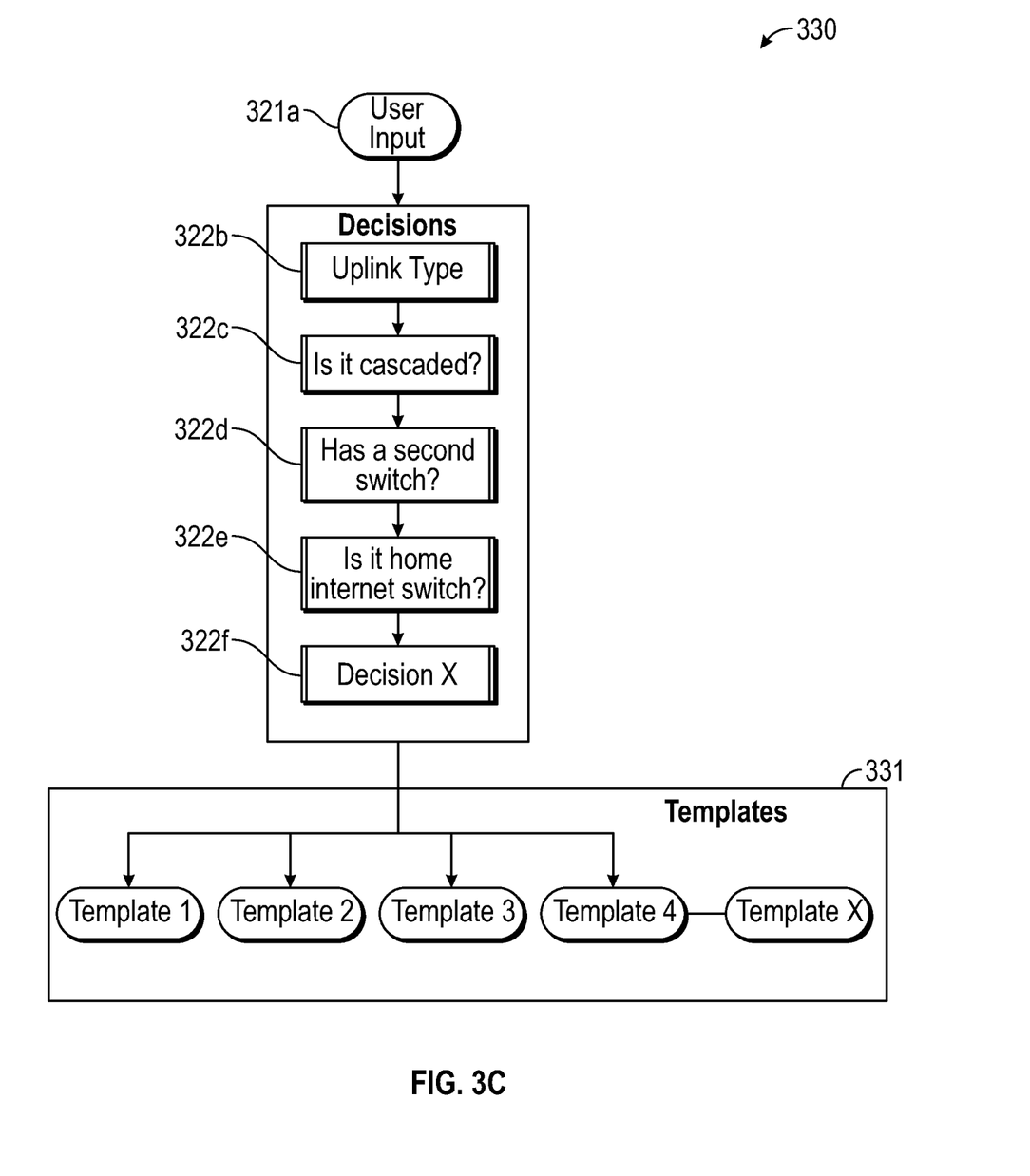

FIG. 3C shows a chart (330) corresponding to an example of the process diagram (320) for developing network engineering designs, and track inventory. (Inventors, please explain how decisions (322a-322f) and templates (331) in FIG. 3C relate to blocks in FIG. 3B.)

Figure 3D:
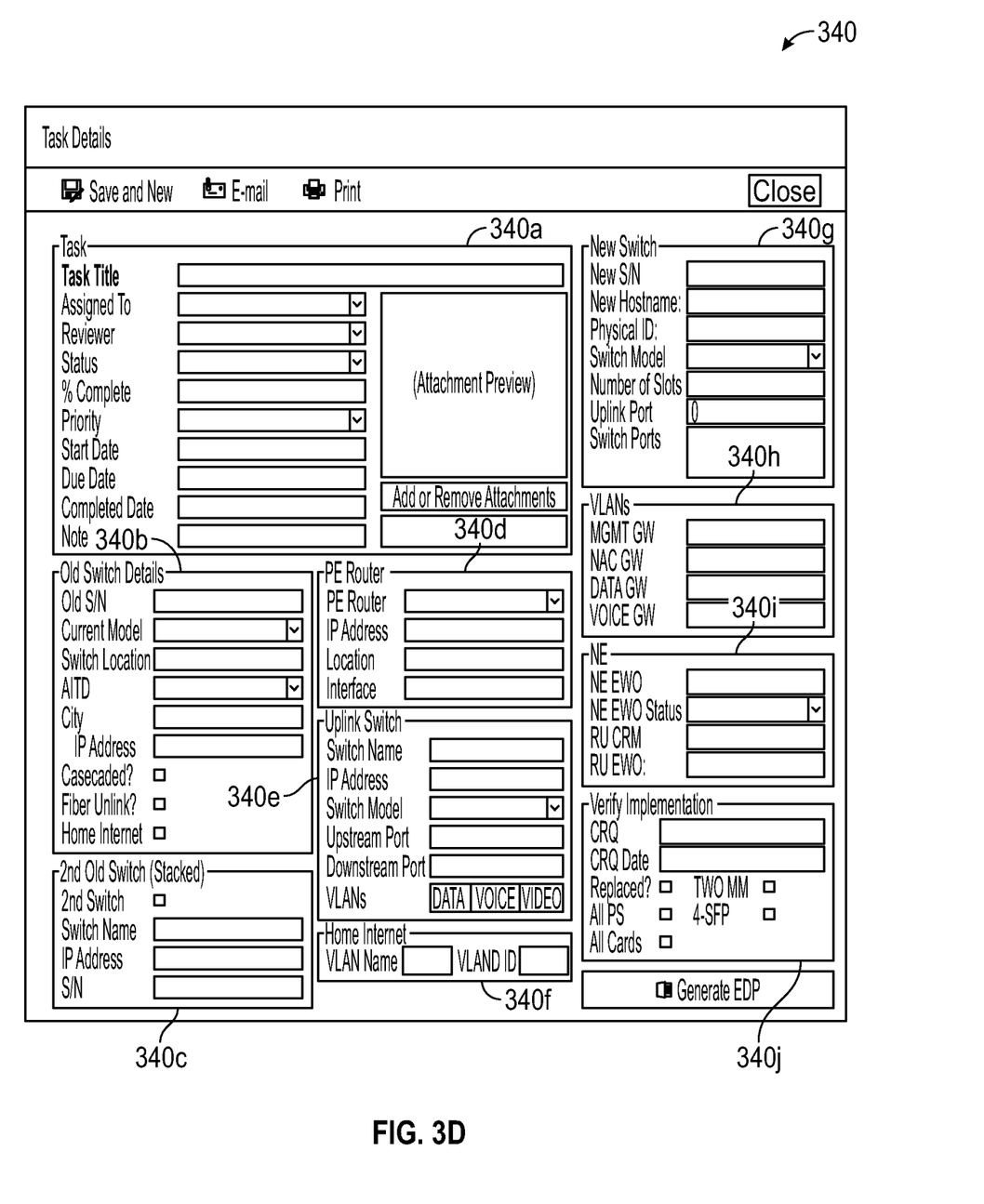

FIG. 3D shows an example task detail form (340) of a database software application (e.g., MS Access) that the user fills out. The example task detail form (340) includes user input blocks (340a-340j). In particular, the information filled out by the user in the input blocks (340a-340j) correspond to the user input (321a)) for the fields (322b-322f) in FIGS. 3B-3C. For example, the input field uplink type (322b) in FIG. 3C may correspond to the user input block (340b) in FIG. 3D. User inputs are used to create a comprehensive repository for automatically creating network engineering designs, reports, and implementation, and automatically tracking inventory. TABLE 1 show examples of engineering designs package (EDP) that are developed using MS Access Database and Visual Basic for application (VBA) based on the EDP templates (331) depicted in FIG. 3C above. The entries listed in TABLE 1 are Microsoft Word documents where the engineer would only fill the required fields in the MS Access application with defined parameters and then the application will dynamically select the proper engineering design templates based on the engineer input. With a single click, an EDP containing device configuration is automatically generated as a Word document and routed for approval.

Table 1

EDP Template LAN Switch Replacement Home Internet (Direct)—2019.docx

EDP Template LAN Switch Replacement Home Internet (Cascaded)—2019.docx

EDP Template LAN Switch Replacement Home Internet (2-to-1 Direct)—2019.docx

EDP Template LAN Switch Replacement Home Internet (2-to-1 Cascaded)—2019.docx

EDP Template LAN Switch Replacement (Cascaded)—2019.docx

EDP Template LAN Switch Replacement (2 to 1 Direct) 2019.docx

EDP Template LAN Switch Replacement (2 to 1 Cascaded)—2019.docx

EDP Template LAN Switch Replacement (Direct)—2019.docx

Figure 3F:
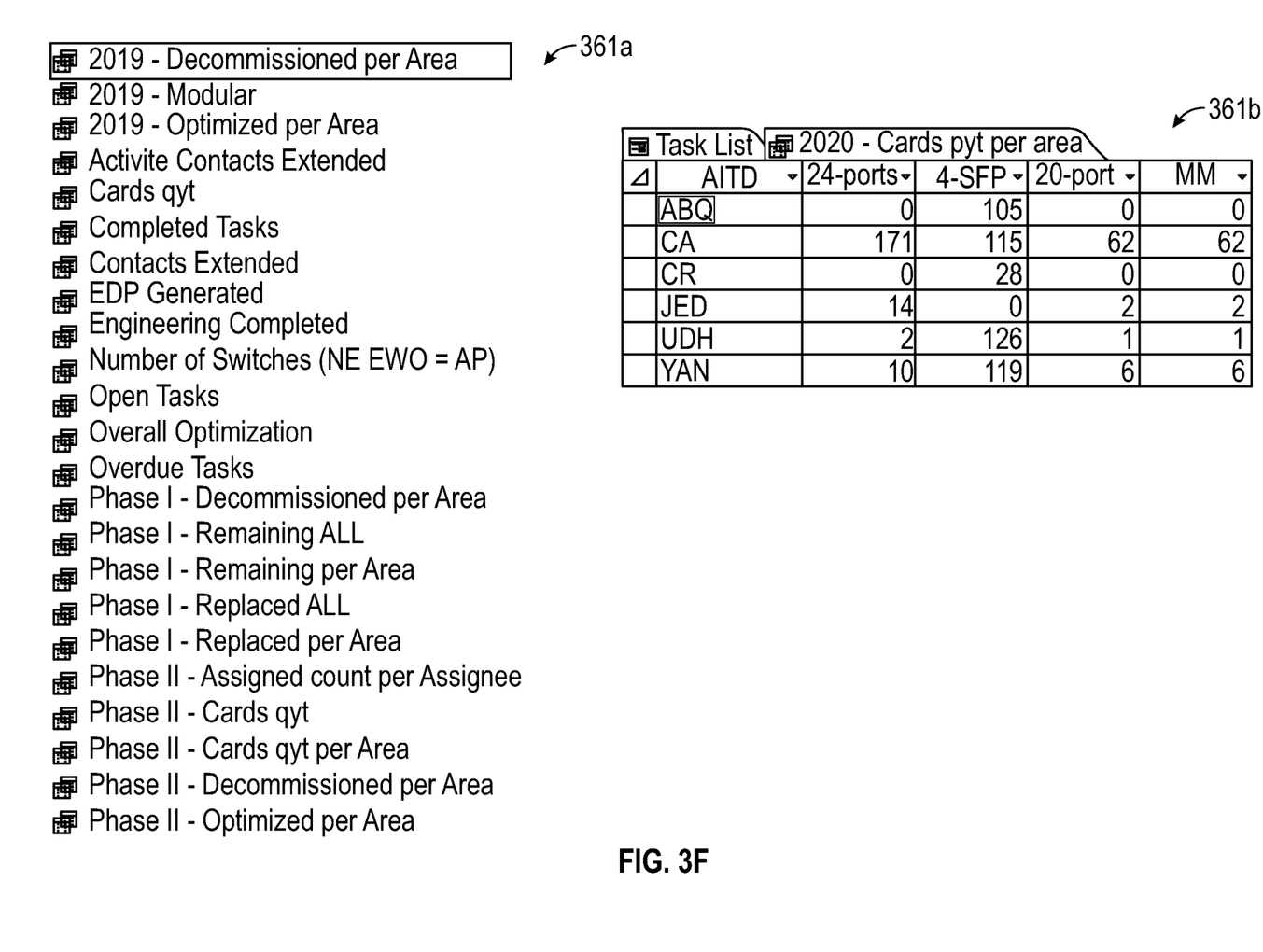

The EDP Templates listed in TABLE 1 above are generated from user inputs and dynamically stored in a central repository that is used to generate reports, provide material inventory, material distribution, and equipment implementation plans. The system (310) may be integrated with a client-server trouble ticketing application (e.g., Remedy system) for tracking the overall implementation progress. For example, the overall implementation progress may be tracked as the example task list (350) shown in FIG. 3E. Each row in the task list (350) corresponds to a set of user input received using the task detail form (340). In particular, each column in the task list (350) corresponds to one data entry field in the task detail form (340). Based on the task list (350), queries may be created to retrieve information on materials distribution, status, generated EDPs, implementation phases, etc. from the central repository. FIG. 3F shows an example of retrieved list (361a) and retrieved table (361b) that contain information on materials distribution, status, generated EDPs, implementation phases, etc. The retrieve list (361a) is an example material inventory document. The retrieved table (361b) is an example material distribution document showing material distribution information for specific equipment for multiple regions. For example, "AITD" is Area IT support Unit for a specific region.

Figure 4A:
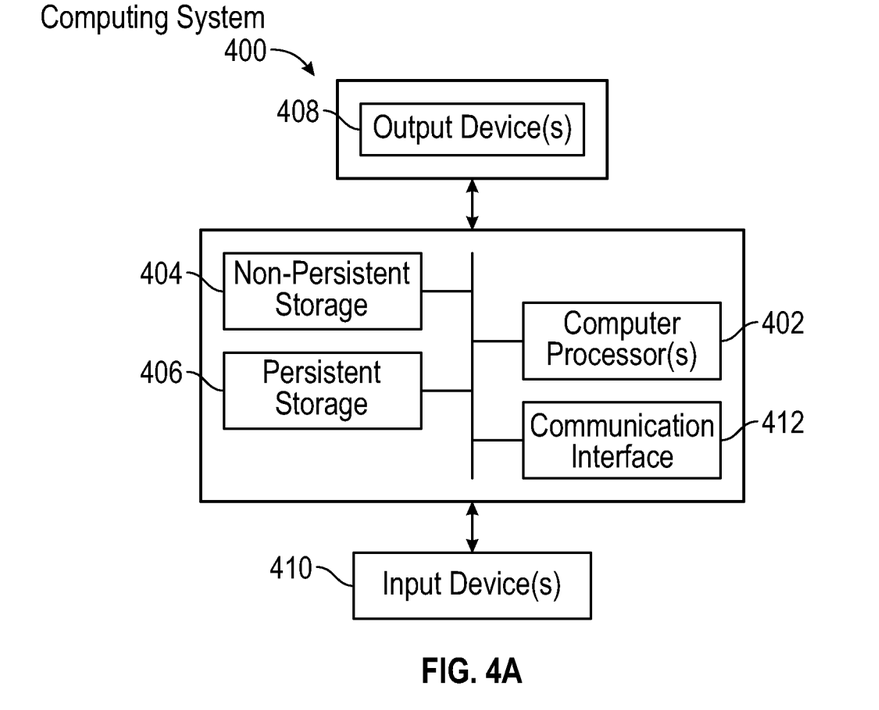
FIGS. 4A and 4B show a computing system in accordance with one or more embodiments.

Embodiments may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 4B:
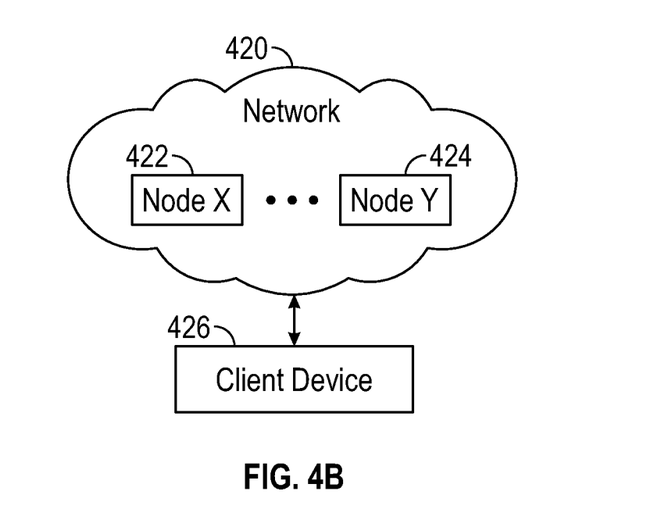

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (for example, node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for network deployment, comprising:
   receiving, from a user by a centralized system, a plurality of completed task detail forms;
   retrieving, by the centralized system and from the plurality of completed task detail forms, deployment task descriptions of a plurality of network devices;
   generating, by the centralized system and based on the deployment task descriptions, an engineering design package comprising a specification and associated configuration and connectivity information of each of the plurality of network devices; and
   deploying, based on the engineering design package, the plurality of network devices,
   wherein said receiving and retrieving are performed using a third party database application,
   wherein said generating is performed using an application software interface between the third party database application and a third party document processing application,
   wherein the third party database application comprises Microsoft Access,
   wherein the third party document processing application comprises Microsoft WORD, and
   wherein the application software interface comprises Virtual Basic Integration.

2. The method of claim 1, wherein deploying the plurality of network devices comprises:
   configuring and connecting, based on the specification and associated configuration and connectivity information, the plurality of network devices.

3. The method of claim 1, comprising:
   generating, by the centralized system and based on the deployment task descriptions, a material inventory document comprising a list of the plurality of network device; and
   facilitating, based on the material inventory document, the network deployment of the plurality of network devices.

4. The method of claim 1, comprising:
   generating, by the centralized system and based on the deployment task descriptions, a material distribution document comprising a list of the plurality of network device with corresponding deployment locations; and
   facilitating, based on the material distribution document, the network deployment of the plurality of network devices.

5. The method of claim 1, comprising:
   generating, by the centralized system and based on the deployment task descriptions, an equipment implementation document comprising a timeline of deploying the plurality of network device; and
   facilitating, based on the equipment implementation document, the network deployment of the plurality of network devices.

6. A system for network deployment, comprising:
   a memory; and
   a computer processor connected to the memory and that:
   receives, from a user, a plurality of completed task detail forms;
   retrieves, from the plurality of completed task detail forms, deployment task descriptions of a plurality of network devices;
   generates, based on the deployment task descriptions, an engineering design package comprising a specification and associated configuration and connectivity information of each of the plurality of network devices; and
   deploys, based on the engineering design package, the plurality of network devices,
   wherein said receiving and retrieving are performed using a third party database application,
   wherein said generating is performed using an application software interface between the third party database application and a third party document processing application,
   wherein the third party database application comprises Microsoft Access,
   wherein the third party document processing application comprises Microsoft WORD, and
   wherein the application software interface comprises Virtual Basic Integration,
   wherein the plurality of completed task detail forms, the deployment task descriptions of the plurality of network devices, and the engineering design package are stored in the memory.

7. The system of claim 6, wherein deploying the plurality of network devices comprises:
   configuring and connecting, based on the specification and associated configuration and connectivity information, the plurality of network devices.

8. The system of claim 6, the computer processor further:
   generates, based on the deployment task descriptions, a material inventory document comprising a list of the plurality of network device; and
   facilitates, based on the material inventory document, the network deployment of the plurality of network devices,
   wherein the material inventory document is stored in the memory.

9. The system of claim 6, the computer processor further:
   generates, based on the deployment task descriptions, a material distribution document comprising a list of the plurality of network device with corresponding deployment locations; and
   facilitates, based on the material distribution document, the network deployment of the plurality of network devices,
   wherein the material distribution document is stored in the memory.

10. The system of claim 6, the computer processor further:
    generates, based on the deployment task descriptions, an equipment implementation document comprising a timeline of deploying the plurality of network device; and
    facilitates, based on the equipment implementation document, the network deployment of the plurality of network devices,
    wherein the equipment implementation document is stored in the memory.

11. A non-transitory computer readable medium (CRM) storing computer readable program code for network deployment, wherein the computer readable program code, when executed by a computer, comprises functionality for:
    receiving, from a user, a plurality of completed task detail forms;

retrieving, from the plurality of completed task detail forms, deployment task descriptions of a plurality of network devices;

generating, based on the deployment task descriptions, an engineering design package comprising a specification and associated configuration and connectivity information of each of the plurality of network devices; and deploying, based on the engineering design package, the plurality of network devices, wherein said receiving and retrieving are performed using a third party database application, wherein said generating is performed using an application software interface between the third party database application and a third party document processing application, wherein the third party database application comprises Microsoft Access, wherein the third party document processing application comprises Microsoft WORD, and wherein the application software interface comprises Virtual Basic Integration.

12. The non-transitory CRM of claim 11, wherein deploying the plurality of network devices comprises:

configuring and connecting, based on the specification and associated configuration and connectivity information, the plurality of network devices.

13. The non-transitory CRM of claim 11, the computer readable program code, when executed by the computer, further comprising functionality for:

generating, based on the deployment task descriptions, a material inventory document comprising a list of the plurality of network device; and facilitating, based on the material inventory document, the network deployment of the plurality of network devices.

14. The non-transitory CRM of claim 11, the computer readable program code, when executed by the computer, further comprising functionality for:

generating, based on the deployment task descriptions, a material distribution document comprising a list of the plurality of network device with corresponding deployment locations; and facilitating, based on the material distribution document, the network deployment of the plurality of network devices.

15. The non-transitory CRM of claim 11, the computer readable program code, when executed by the computer, further comprising functionality for:

generating, based on the deployment task descriptions, an equipment implementation document comprising a timeline of deploying the plurality of network device; and facilitating, based on the equipment implementation document, the network deployment of the plurality of network devices.

* * * * *